United States Patent [19]
Sullins

[11] 3,990,974
[45] Nov. 9, 1976

[54] WASTE TREATMENT AND SOLIDS SEPARATING SYSTEM

[75] Inventor: John K. Sullins, Kingsport, Tenn.
[73] Assignee: Canton Textile Mills, Inc., Canton, Ga.
[22] Filed: Aug. 6, 1975
[21] Appl. No.: 602,403

[52] U.S. Cl. .......................... 210/96 R; 210/195 S; 210/220; 210/522
[51] Int. Cl.² ...................... C02C 1/08; C02B 3/08
[58] Field of Search .............. 210/14, 15, 63, 96 R, 210/195 S, 220, 221 R, 521, 522; 261/DIG. 75

[56] References Cited
UNITED STATES PATENTS

| | | | |
|---|---|---|---|
| 2,616,848 | 11/1952 | Griffith | 210/15 X |
| 3,399,135 | 8/1968 | Conley, Jr. et al. | 210/521 X |
| 3,426,899 | 2/1969 | Smith | 210/96 |
| 3,482,694 | 12/1969 | Rice et al. | 210/522 X |
| 3,672,511 | 6/1972 | Watson et al. | 210/522 X |
| 3,706,384 | 12/1972 | Weijman-Hane | 210/522 X |
| 3,812,970 | 5/1974 | Yamazaki | 210/521 X |
| 3,846,292 | 11/1974 | LeCompte, Jr. | 210/14 |
| 3,872,003 | 3/1975 | Walker | 210/15 X |

FOREIGN PATENTS OR APPLICATIONS

| 1,932,640 | 2/1971 | Germany | 210/15 |
|---|---|---|---|

Primary Examiner—Thomas G. Wyse
Assistant Examiner—Robert H. Spitzer
Attorney, Agent, or Firm—Walter M. Rodgers; Walter A. Rodgers

[57] ABSTRACT

A waste treatment and solids separating system includes a reservoir, feed means for causing waste liquid to flow into said reservoir and outwardly therefrom, ejector means disposed in said reservoir and in communication with atmosphere, pump means for withdrawing liquid from said reservoir and for forcing such withdrawn liquid through said ejector means in one general substantially horizontal direction to aerate said liquid from atmosphere, sensor means for sensing the concentration of oxygen dissolved in the liquid in said reservoir, control means for varying the rate at which said pump means forces liquid through said ejector means in coordination with variations in oxygen concentration in said liquid together with tube settler means disposed in said reservoir and having substantially vertically disposed juxtaposed parallel tubes for effecting settling of solid materials due to a ricocheting path of flow of the liquid which flows generally upward through the tubes caused by the combined action of said feed means and of said ejector means whereby the velocity of flow upwardly of liquid is reduced and the frictional contact of solids against the inner surfaces of the tube walls impedes the movement of the solids and aids in separating the solids from the liquid.

4 Claims, 10 Drawing Figures

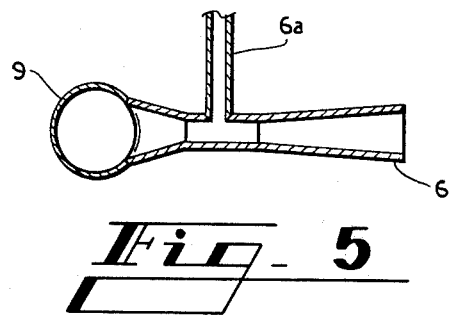
Fig_5
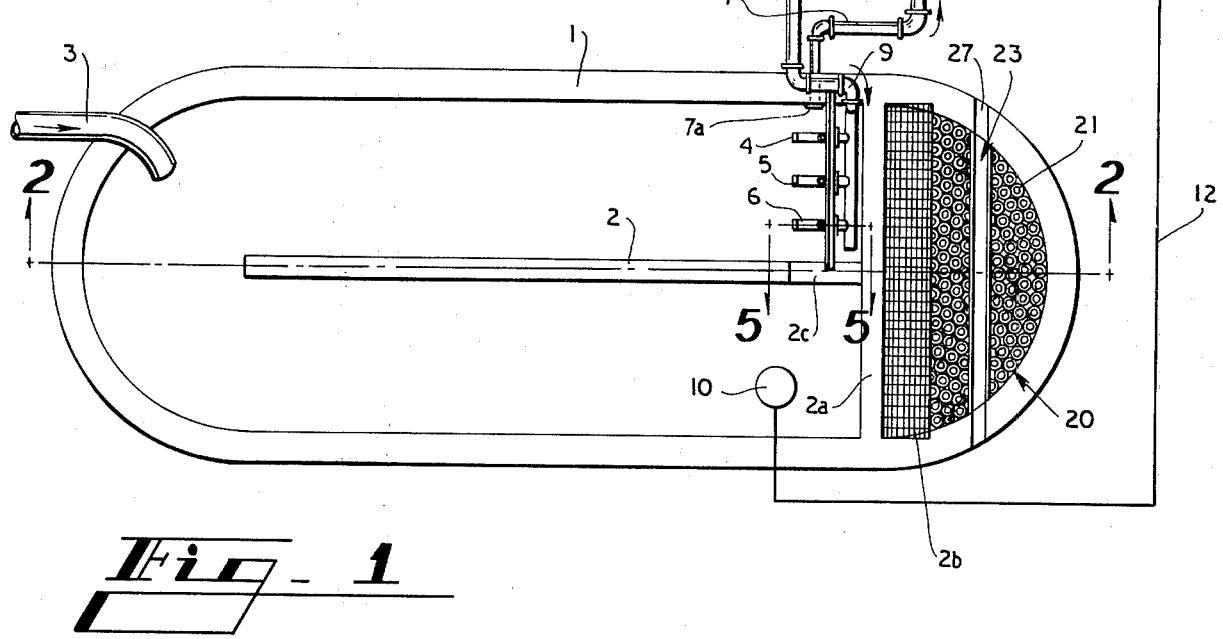
Fig_1
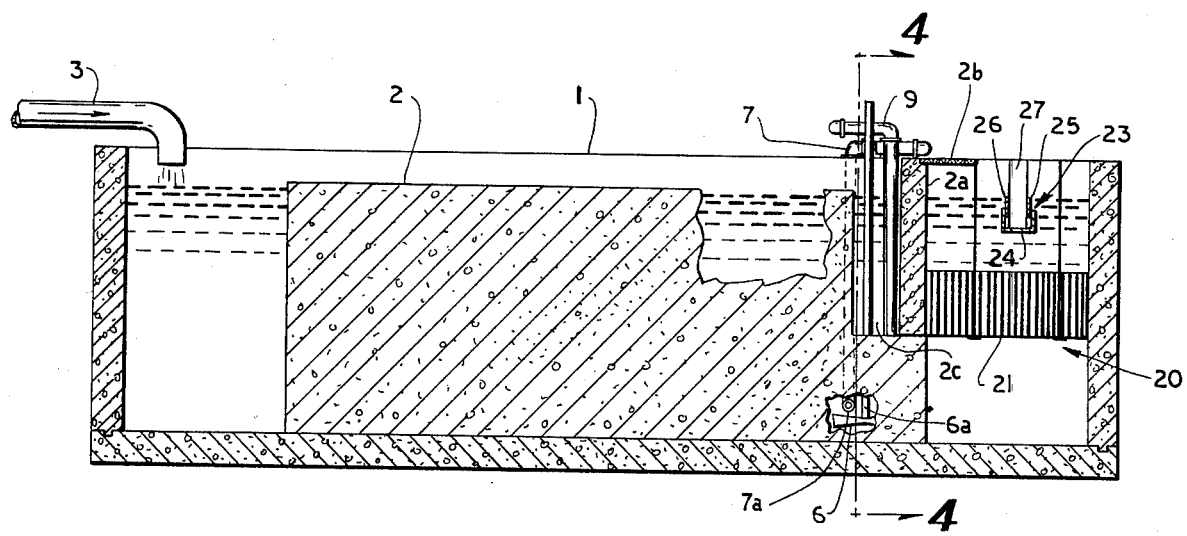
Fig_2

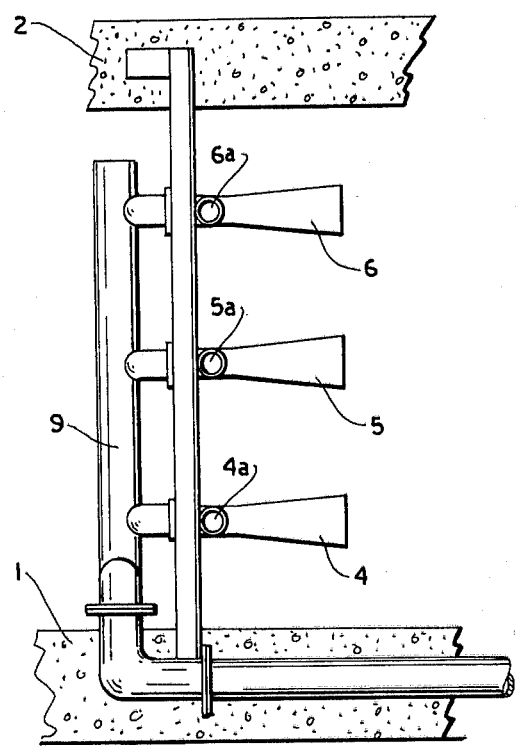
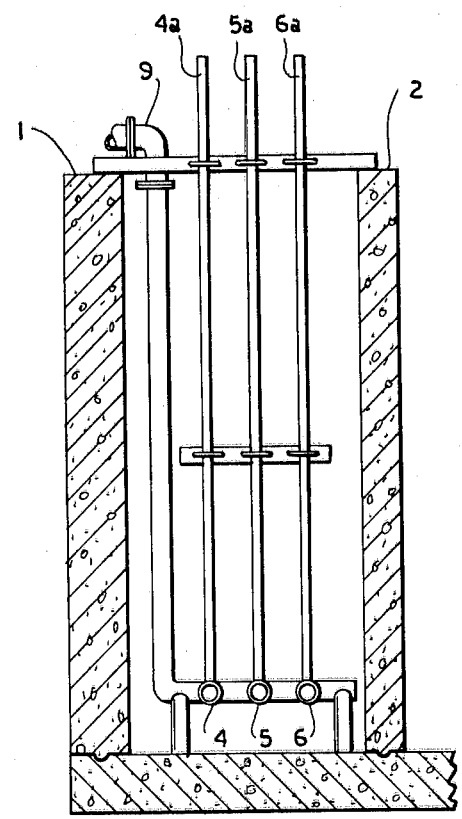
Fig. 3
Fig. 4
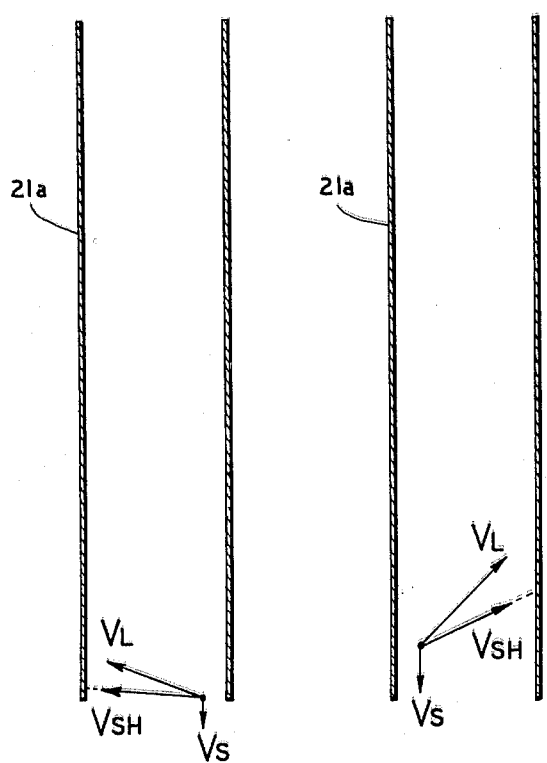
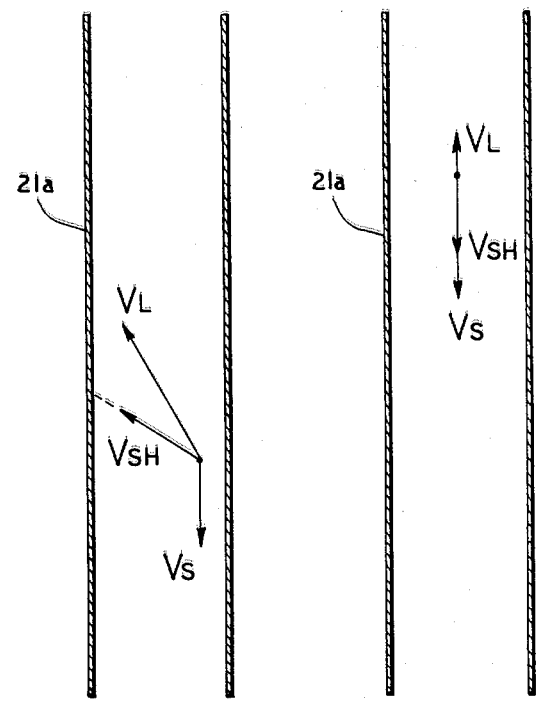
Fig. 6A    Fig. 6B    Fig. 6C    Fig. 6D

WASTE TREATMENT AND SOLIDS SEPARATING SYSTEM

In order efficiently to treat biological waste, the dissolved oxygen level must be maintained at a minimum of 1.0 milligrams per liter. Preferably the level of dissolved oxygen should be maintained between 1.0 and 2.0 milligrams per liter. Waste liquid contains a widely varying biological population and also is characterized by wide variations in flow rates day by day and within a day. Wide variations in sanitary and in industrial wastes are to be expected.

Conventional aeration systems may be of the so-called surface aerator type in which propellers churn and cavitate the liquid to increase the air-liquid interface thus to aerate the water. Another type of aeration system is of the so-called diffused air type in which air is injected by blowers below the liquid surface to create bubbles and a resultant large air-liquid interface. Also known is a system which utilizes venturi type injectors in which air is directed into the throat of a venturi by means of blowers.

None of the aforementioned systems is capable of controlling the dissolved oxygen content of liquid in a precisely controlled manner and at a predetermined level.

Settlers of the so-called tube type are known in which a plurality of generally parallel juxtaposed hollow tubes are arranged at a substantial angle to vertical and wherein liquid containing suspended solids is caused to flow upwardly through such tubes in a manner to effect settling of the solid material from the liquid. The solid material settles downwardly and outwardly through the bottom ends of the settler tubes and the liquid is drawn off. In many instances, however, such settled solids tend to accumulate and to clog the settler tubes. If a group of tubes becomes clogged, the velocity of flow in the remaining tubes tends to increase and in turn to affect in a deleterious manner the efficiency of settling.

According to one form of the present invention, a reservoir through which liquid containing waste or other suspended solids is caused to flow, is provided with sensing means for determining the actual concentration of oxygen dissolved in the liquid and the rate of flow of liquid withdrawn from the reservoir and forced through aerated venturi-type ejectors mounted within the reservoir is controlled in accordance with variations in the degree of concentration of oxygen so that the level of dissolved oxygen is maintained at a precisely controlled predetermined amount. The liquid containing suspended solids is caused to flow upwardly through a tube settler, the tubes of which are substantially vertically disposed so as to effect separation of solids due to the impingement in a ricocheting fashion of liquid containing solids along the inner surfaces of the vertically disposed tubes in such manner as to reduce the velocity of liquid and to take advantage of the friction between the solids and the tubes so as to allow the suspended solids to settle downwardly and out of the lower ends of the tubes without any substantial tendency to clog the tubes. Horizontal movement is imparted to the liquid before it enters the settler tubes by ejector means or by other suitable motive means such as brushes or blowers. Such motive means also aerates the liquid.

Dissolved oxygen levels which are too low tend to cause the bacteria to become anaerobic and methane and other malodorous gases are formed. In addition the biological sludge tends to hydrolyze and thus becomes less dense and more difficult to settle and may remain in suspension.

On the other hand if the dissolved oxygen becomes excessive, flotation characteristics are imparted to the solids which tend to impede the settling characteristics of the solids and thus tend to cause large quantities of the solids to remain in suspension which of course defeats one purpose of waste treatment. Excessive levels of dissolved oxygen also mean excessive and wasted power which in an aeration system constitutes the major operating expense and is substantial in a large system.

Biological solids are retained in an aeration system by settling the effluent from the system in a sedimentation type clarification arrangement and by then recycling the concentrated solids back to the aeration system. Should the flow rate of liquid become greater, quiescent conditions required for proper settling are disturbed. If high velocity flow rates are reduced by substantially increasing the volumetric capacity of the clarification reservoir, it may be necessary to keep the system in a state of agitation by aeration in order to maintain the solids in an aerobic and viable condition. In order to separate the solids, a settling process requires quiescent conditions which preclude aeration. During sedimentation and while quiescent conditions prevail, oxygen demand continues in order to prevent the establishment of anaerobic conditions and the resulting difficulties which are well known. Where diffused air injection by blowers is employed or where surface aerators are used, quiescent or dead spots are often present in the system and anaerobic conditions tend to prevail in these locations.

According to this invention aeration is effected without interfering with the quiescent conditions needed for settling by ejector means which are mounted in a treatment reservoir containing waste liquid and are employed to aerate the liquid and in addition such ejector means are used to impart substantially horizontal movement to the liquid to be treated in conjunction with upward flow through vertical tubes of a tube settler so that solid materials to be separated are allowed to settle through the vertical tubes of the settler due to a slowdown in the velocity of movement upwardly through the tubes by ricocheting action and the friction between the solids and the tubes caused by the horizontal movement of liquid due to the injector means combined with the generally upward movement of liquid containing solids through the vertically disposed tubes due to the flow of liquid into and out of the treatment reservoir.

Where all other variables which affect solubility are fixed, the quantity of oxygen placed in solution with water is directly proportional to the ratio of the volume of air to the volume of water. The quantity of air supplied to the throat of a venturi is directly proportional to the velocity of liquid flowing through the throat of the venturi. Velocity of liquid flowing through a venturi is proportional to the pressure in the liquid on the intake side of the venturi. Therefore the volume of air injected through the throat of a venturi is a function of the pressure in the liquid on the intake side of the venturi. Although volume of air delivered by a venturi is a function of intake pressure, it is not a straight line function since transfer is more efficient at the lower pressures. Higher inlet pressures result in losses across the venturi with a resultant loss in water volume. Power consumption of a centrifugal type pump is directly proportional to flow rate and pressure. Developed pressure and volume of a particular pump is a function of the velocity of the pump impeller which may be expressed in terms of revolutions per unit time. Thus if a venturi type ejector is used to inject and mix air with water for aeration of a biological waste treatment system, the dissolved oxygen level can be easily controlled by merely varying the revolutions per minute of a centrifugal type pump. Of course if the speed of rotation of the pump impeller is controlled at a level such as to provide the desired and most effective concentration of dissolved oxygen, substantial savings in power required are effected. Not only are savings in power effected but the disadvantages which result from concentrations of dissolved oxygen which are too great or too small are avoided and the overall efficiency of waste treatment is greatly enhanced. Activated sludge containing bacterial population may be depleted of oxygen when supplied to a quiescent clarifier. Under these conditions these solids become anaerobic with all the attendant difficulties including undesirable odors, floating characteristics and the like. Before returning the solids to the biological system, additional oxygen is required simply to satisfy the immediate oxygen demand. For this additional reason it is desirable to maintain aerobic conditions and according to one aspect of this invention this result is achieved by constantly monitoring the dissolved oxygen level and by maintaining this level at a predetermined optimum condition.

For a better understanding of the invention reference may be had to the following description taken in conjunction with the accompanying drawings in which FIG. 1 is a plan view of a treatment reservoir having ejector means for aerating the liquid from atmosphere and in which sensor and control means are provided for controlling the velocity of rotation of a pump impeller thereby to control the rate of flow of liquid through the ejectors and in turn the dissolved oxygen level, the reservoir also being provided with a tube settler;

FIG. 2 is a cross-sectional view taken along the line designated 2—2 in FIG. 1;

FIG. 3 is an enlarged view of a portion of FIG. 1 showing the ejectors;

FIG. 4 is a cross section view taken along the line designated 4—4 in FIG. 2 showing the ejectors;

FIG. 5 is a cross-sectional view taken along the line designated 5—5 in FIG. 1 showing one ejector in section; and in which FIGS. 6A, 6B, 6C, and 6D are vectorial representations of the flow conditions which are characteristic of one aspect of this invention and which have to do with settling of solids in vertical tubes.

With reference to the drawings, the numeral 1 designates a reservoir sometimes called an oxidation ditch and which may take the form of a so-called race track as shown in FIG. 1. Of course other shapes may be employed such as circular configurations, for example. Reservoir 1 is provided with a central wall structure designated by the numeral 2 and waste liquid to be treated is fed into reservoir 1 through feed means including inlet conduit 3 and the lower portion flows under cross wall 2a. The upper portion flows between cross wall 2a and the right end of central wall 2 through passage 2c. If a circular or other configuration is used, care should be taken to insure circulation throughout the body of liquid.

Generally counterclockwise motion is imparted to the liquid in reservoir 1 about the central wall-like structure 2 by means of a plurality of ejectors designated by the numerals 4, 5 and 6. Of course the number of ejectors and the size thereof is determined by the particular conditions in a manner well known in the art. Ejectors 4, 5 and 6 may be mounted on and in communication with conduit means 9 and may be constructed as shown in FIGS. 3 and 4. Grill 2b is a walkway.

While the invention is not limited to any particular type of ejector, one suitable injector is model 68A manufactured by the Penn Berthy Division of Houdaille Industries Inc. Other suitable ejectors are made by Schute and Koertig Co.

Ejectors are supplied with liquid drawn from reservoir 1 through conduit 7 which communicates via opening 7a with the reservoir by means of pump 8 and liquid is supplied to injectors 4, 5 and 6 via conduit 9. Since each of the ejectors 4, 5 and 6 is provided with a vertically disposed aerator tube 4a, 5a and 6a respectively each of which communicates with atmosphere, flow of liquid through conduit 9 and the main body of the ejectors, causes a reduction of pressure at the venturi throat of the ejectors and thus draws atmospheric air into solution with the liquid. Opening 7a is disposed upstream from the direction of flow of liquid discharged by the ejectors as shown in FIG. 2 in order to prevent immediate recirculation of liquid through the pump and conduits.

In order to regulate and control the degree of concentration of dissolved oxygen, a sensor designated by the numeral 10 is immersed in the liquid in reservoir 1 and is connected with analyzer 11 and with control device 13 via conduit 12 which in turn regulates the effective diameter of adjustable pulley 14 which cooperates with a driving belt 15 trained over a pulley 16 fixedly mounted on the shaft of constant speed motor 17. Analyzer 11, control device 13 and associated elements comprise control means. Variations in the degree of concentration of oxygen within reservoir 1 cause signals to be supplied via conduit 12 to analyzer 11 and control device 13 which in turn varies the effective diameter of pulley 14 in known manner. Such variations result in varying the speed of the impeller of pump 8 and in turn the amount of liquid supplied through conduit 9 to the ejectors 4, 5 and 6. By this means the level of oxygen in reservoir 1 is maintained at a substantially constant optimum value. The analyzer 11 is capable of measuring the dissolved oxygen as a result of signals received from sensor 10. Such measurement is instantaneous and a signal supplied from analyzer 11 effectively controls the control mechanism 13. A suitable analyzer is manufactured by Yellowstone Instruments Inc.

With the speed of the impeller of pump 8 being varied in accordance with dissolved oxygen requirements, the degree of concentration of dissolved oxygen is maintained substantially constant while the ejectors 4, 5 and 6 constantly maintain substantially uniform movement of liquid within the reservoir 1 in a generally counterclockwise direction about the central medial wall 2. This continuous movement and optimum concentration of oxygen effect constantly maintained aerobic viable conditions which add considerably to the efficiency and effectiveness of waste treatment according to one facet of this invention.

The tube settler constructed according to one aspect of this invention is generally designated by the numeral 20 in the drawings. The construction of this settler is such that a plurality of hollow tubes 21 are arranged in parallel juxtaposed relation to each other and are approximately 2 inches in diameter. Of course the invention is not limited to any particular size tube. Since waste liquid to be treated is constantly supplied through feed means comprising conduit 3 to reservoir 1, it is necessary to provide means for discharging this liquid and such means is provided in the form of outlet 23 which may comprise a bottom plate 24 and a pair of weirs 25 and 26 over which liquid which has passed upwardly through the vertical tube settler 20 is allowed to flow inwardly over the top edges of weirs 25 and 26 and outwardly through the discharge indicated at 27.

Of course movement of liquid upwardly through the tubes 21 of the tube settler is due to the inflow of liquid through conduit 3 which flows upwardly through the tubes 21 and outwardly at discharge 27.

The upward passage of liquid containing solids to be separated through the tubes 21 is of a ricocheting path due to the vertical component of flow caused by the feed means which causes inflow of liquid inwardly through conduit 3 and upwardly through tubes 21 and also a horizontal flow component imparted to the liquid by ejectors 4, 5 and 6 which impart a generally horizontal direction of flow to the liquid in and around reservoir 1.

With reference to FIGS. 6A, 6B, 6C and 6D the vector represented as $V_L$ represents the velocity of liquid flowing in reservoir 1 as it approaches the bottom ends of the tubes 21. The vector $V_S$ represents the velocity at which solids tend to settle downwardly due to the action of gravity. The vector $V_{sH}$ represents solid height relative to the liquid at a point in time or the position of a particular solid particle at various stages during the upward movement of the liquid through the tubes 21. For example in FIG. 6A a particular particle $V_{sH}$ is shown as the liquid enters the bottom of tube 21a. Liquid flowing in the direction indicated by vector $V_L$ impinges on the inside of the tube 21a and ricochets to the right as graphically represented in FIG. 6B. At the stage represented by FIG. 6B which is at a level somewhat above that represented in FIG. 6A, the settling rate is somewhat greater due to the friction between the solid particles and the tube wall and to the velocity $V_L$ of the liquid being somewhat reduced. A particular particle travelling in the direction indicated by the vector $V_{sH}$ in FIG. 6B impinges on the right part of the inner surface of tube 21a and ricochets as represented in FIG. 6C. As the liquid approaches the top of tube 21a conditions are represented as shown in FIG. 6D. Under these conditions the settling rate is sufficient as represented by vector Vs when combined with the reduced upward velocity of the liquid as represented by the short vector $V_L$ so that the particle settles downwardly and is discharged through the bottom end of tube 21a.

Conventional settling tubes which are disposed at approximately 60° to vertical frequently allow the settled particles to accumulate within the lower portions of the tubes. Ultimately certain tubes are clogged and the flow of liquid therethrough is prevented. If a particular tube or tubes should become clogged as is frequent with conventional currently known tube settlers, the velocity of flow through the remaining unclogged tubes increases. An increase in the rate of flow through the remaining unclogged tubes tends to hinder the settling of the solid material and thus tends to render settlers of known construction ineffective or at least only partially effective. Since relatively calm conditions for the liquid are necessary for proper settling, the discharge ends of the ejectors 4, 5 and 6 are directed away from the settler 20 so as to have a minimal disturbing effect on settling.

From the above description, it is apparent that by this invention, aerobic and viable conditions are constantly maintained and efficiency of treatment greatly enhanced by the constant control and monitoring of the dissolved oxygen level and also by the cooperation of the ejector means and the feed means by which the direction of flow of liquid to be treated upwardly through the vertical tube settler is characterized by a ricocheting delayed velocity of flow through the vertical tubes which effects efficient settling of solids without impairing aeration of the liquid and with a minimum likelihood of clogging of the tubes.

If the invention is used in conjunction with a non-biological waste system, liquid motive means other than venturi type ejectors could be employed in conjunction with the vertical settler tubes such as rotary impellers or other known liquid motive means.

The embodiments of the invention in which an exclusive property or privilege is claimed are defined as follows:

1. An aerobic waste treatment system comprising a reservoir having an outlet, feed means for causing waste liquid to flow into said reservoir and outwardly through said outlet, ejector means in said reservoir and in communication with atmosphere, pump means interconnected with said reservoir through an opening formed therein and an associated conduit and with said ejector means via conduit means for withdrawing liquid from said reservoir and for forcing such withdrawn liquid through said ejector means in one general substantially horizontal direction for imparting only atmospheric air directly to the liquid while flowing through said ejector means so as to aerate said liquid from atmosphere and to impart substantially horizontal flow to the liquid, the opening in said reservoir through which liquid is supplied to said pump means being disposed adjacent to and upstream from the direction of discharge of liquid from said ejector means, sensor means for sensing the concentration of oxygen dissolved in the liquid in said reservoir, control means operable in coordination with variations in said sensor means for varying the speed of said pump means thereby to vary the rate at which said pump means forces liquid through said conduit and through said conduit means and said ejector means so as to maintain the concentration of dissolved oxygen at a predetermined level, a wall disposed in the upper part of said reservoir and between said feed means and said outlet so as to prevent direct communication therebetween and so as to accommodate flow thereunder from said ejector means, and a tube settler disposed in said reservoir adjacent said wall and having a plurality of parallel juxtaposed substantially vertical tubes whose upper ends are in direct communication with said outlet and through which the liquid flows upwardly and is then discharged at said outlet and through which settled solids fall vertically downward and in oppositiion to the upward flow of liquid, said tube settler being remote from the discharge end of said ejector means and at a level somewhat above said ejector means.

2. A system according to claim 1 wherein said ejector means comprises a venturi and an aeration conduit establishing communication between the throat of said venturi and atmosphere.

3. A system according to claim 1 wherein the inlet to said ejector means from said pump means is adjacent said substantially vertical tubes and wherein the outlet of said ejector means is more remote from said tubes than said inlet and the liquid to be treated is forced upwardly through said tubes and in a ricocheting path due to the impingement of liquid along the insides of said tubes by the combined action of said ejectors by which movement is imparted to the liquid in said one generally horizontal direction and transverse to the lower ends of said substantially vertical tubes and by the action of said feed means by which the liquid is forced upwardly through said conduits.

4. A system for separating solids suspended in a liquid, said system comprising a reservoir having an outlet, feed means for causing liquid having solids in suspension to flow into said reservoir and outwardly through said outlet, motive means in said reservoir for forcing liquid to flow in a substantially horizontal direction, a wall disposed in the upper part of said reservoir and between said feed means and said outlet so as to prevent direct communication therebetween and so as to accommodate flow thereunder from said motive means and a tube settler in said reservoir adjacent said wall and comprising a plurality of parallel juxtaposed substantially vertical tubes arranged with their lower ends immersed in said liquid and with their upper ends in communication with said outlet so that liquid containing solids is forced upwardly through said tubes and in a ricocheting path due to the impingement of liquid along the insides of said tubes by the combined action of said motive means by which movement is imparted to the liquid in said generally horizontal direction and by the action of said feed means by which the liquid is forced upwardly through said tubes and solids settle vertically downward and out of said tubes due to the force of gravity, said motive means being disposed at a level somewhat below the lower ends of said tubes.

* * * * *